United States Patent
Song

(10) Patent No.: US 11,206,448 B2
(45) Date of Patent: Dec. 21, 2021

(54) METHOD AND APPARATUS FOR SELECTING BACKGROUND MUSIC FOR VIDEO SHOOTING, TERMINAL DEVICE AND MEDIUM

(71) Applicant: Beijing Microlive Vision Technology Co., Ltd., Beijing (CN)

(72) Inventor: Yu Song, Beijing (CN)

(73) Assignee: Beijing Microlive Vision Technology Co., Ltd., Beijing (CN)

( * ) Notice: Subject to any disclaimer, the term of this patent is extended or adjusted under 35 U.S.C. 154(b) by 0 days.

(21) Appl. No.: 16/760,891

(22) PCT Filed: Dec. 28, 2018

(86) PCT No.: PCT/CN2018/124769
§ 371 (c)(1),
(2) Date: Apr. 30, 2020

(87) PCT Pub. No.: WO2020/010814
PCT Pub. Date: Jan. 16, 2020

(65) Prior Publication Data
US 2021/0195284 A1     Jun. 24, 2021

(30) Foreign Application Priority Data
Jul. 12, 2018 (CN) .......................... 201810764281.6

(51) Int. Cl.
*H04N 21/439* (2011.01)
*H04N 21/44* (2011.01)
(Continued)

(52) U.S. Cl.
CPC ..... *H04N 21/44016* (2013.01); *H04N 21/439* (2013.01); *H04N 21/4334* (2013.01); *H04N 21/44008* (2013.01); *H04N 21/8113* (2013.01)

(58) Field of Classification Search
CPC ......... H04N 21/44016; H04N 21/4334; H04N 21/439; H04N 21/44008; H04N 21/8113
See application file for complete search history.

(56) References Cited

U.S. PATENT DOCUMENTS

| | | | | |
|---|---|---|---|---|
| 2013/0031220 A1* | 1/2013 | Moncavage | ........... | G10H 1/361 709/219 |
| 2013/0070093 A1* | 3/2013 | Rivera | ............... | H04N 21/4126 348/143 |
| 2018/0005618 A1* | 1/2018 | Liu | ......................... | G10H 1/361 |

FOREIGN PATENT DOCUMENTS

| | | |
|---|---|---|
| CN | 104598502 A | 5/2015 |
| CN | 105530440 A | 4/2016 |

(Continued)

OTHER PUBLICATIONS

International Patent Application No. PCT/CN2018/124769; Int'l Search Report; dated Mar. 28, 2019; 2 pages.

(Continued)

*Primary Examiner* — Thai Q Tran
*Assistant Examiner* — Jose M Mesa
(74) *Attorney, Agent, or Firm* — BakerHostetler

(57) ABSTRACT

A method and an apparatus for selecting a background music for video shooting, a terminal device and a medium are disclosed by embodiments of the present disclosure. The method has the steps of: acquiring a viewing instruction for a specified music; jumping to a details page of a complete music corresponding to the specified music according to the viewing instruction; and using the complete music as a background music for video shooting after a shooting-the-same instruction is acquired on the details page.

15 Claims, 16 Drawing Sheets

(51) Int. Cl.
   *H04N 21/433*   (2011.01)
   *H04N 21/81*    (2011.01)

(56) References Cited

FOREIGN PATENT DOCUMENTS

| CN | 106375782 A | 2/2017 |
|---|---|---|
| CN | 106940996 A | 7/2017 |
| CN | 107026986 A | 8/2017 |
| CN | 107959873 A | 4/2018 |
| CN | 108055490 A | 5/2018 |
| CN | 108668164 A | 10/2018 |

OTHER PUBLICATIONS https://soft.shouji.com.cn/news/4773.html; "How does Douyin take someone's original? The same soundtrack video tutorial"; Jun. 2018; accessed Apr. 25, 2020; 3 pages.

http://mydown.yesky.com/news/87353928.html; "The specific steps of shooting the same original sound video in Douyin"; Jun. 2018; accessed Apr. 25, 2020; 3 pages.

https://www.crsky.com/zixun/21296.html; "How to use Douyin's video sound to shoot video Douyin to shoot the same native video"; Jun. 2018; accessed Apr. 25, 2020; 4 pages.

http://www.downza.cn/xy/2586.html; "How to share the same original sound video in Douyin"; Jun. 2018; accessed Apr. 25, 2020; 3 pages.

\* cited by examiner

METHOD AND APPARATUS FOR SELECTING BACKGROUND MUSIC FOR VIDEO SHOOTING, TERMINAL DEVICE AND MEDIUM

CROSS-REFERENCE TO RELATED APPLICATIONS

The present application is the national phase application of International Patent Application No. PCT/CN2018/124769, titled "METHOD AND APPARATUS FOR SELECTING BACKGROUND MUSIC FOR VIDEO SHOOTING, TERMINAL DEVICE AND MEDIUM", filed on Dec. 28, 2018, which claims priority to Chinese patent application No. 201810764281.6, filed on Jul. 12, 2018 with the Chinese Patent Office, both of which are incorporated herein by reference in their entities.

FIELD OF THE INVENTION

Embodiments of the present disclosure relate to the technical field of network communication, for example, to a method and an apparatus for selecting a background music for video shooting, a terminal device and a medium.

BACKGROUND OF THE INVENTION

With the development of computer technology, Internet technology and wireless technology, a variety of video applications loaded on a terminal have emerged. Users can use the video applications such as short video social applications to shoot videos, share videos, and watch videos shared by other people, so that they can meet more friends and know about various anecdotes while sharing their lives with others.

More and more short video applications have emerged, and people's demands are also growing. The short video shooting technology in the related art no longer can meet people's increasing demands on short video shooting in terms of convenience.

SUMMARY OF THE INVENTION

Embodiments of the present disclosure provide a method and an apparatus for selecting a background music for video shooting, a terminal device and a medium, which are capable of improving the convenience of selecting a background music during video shooting.

An embodiment of the present disclosure provides a method for selecting a background music for video shooting, which includes:

acquiring a viewing instruction for a specified music;

jumping to a details page of a complete music corresponding to the specified music according to the viewing instruction; and using the complete music as a background music for video shooting after a shooting-the-same instruction is acquired on the details page.

An embodiment of the present disclosure further provides an apparatus for selecting a background music for video shooting, which includes:

an instruction acquisition module, configured to acquire a viewing instruction for a specified music;

a page jumping module, configured to jump to a details page of a complete music corresponding to the specified music according to the viewing instruction; and a video shooting module, configured to use the complete music as a background music for video shooting after a shooting-the-same instruction is acquired on the details page.

An embodiment of the present disclosure further provides a terminal device, which includes:

one or more processors; and a memory configured to store one or more programs;

wherein when the one or more programs are executed by the one or more processors, the one or more processors are caused to implement the method for selecting a background music for video shooting as described in the embodiment of the present disclosure.

An embodiment of the present disclosure further provides a computer readable storage medium having a computer program stored thereon, wherein when the computer program is executed by a processor, the method for selecting a background music for video shooting as described in the embodiment of the present disclosure is implemented.

In the embodiments of the present disclosure, a details page of a complete music corresponding to a specified music is jumped to according to a viewing instruction for the specified music, and the complete music is used as a background music for video shooting after a shooting-the-same instruction is acquired on the details page. In this way, the problem that the short video shooting technology in the related art cannot meet people's increasing demands on short video shooting in terms of convenience is solved, the specified music can be conveniently used for video shooting, user's operations are saved, and the convenience of background music selection during video shooting is improved.

DETAILED DESCRIPTION OF EMBODIMENTS

Figure 1A:
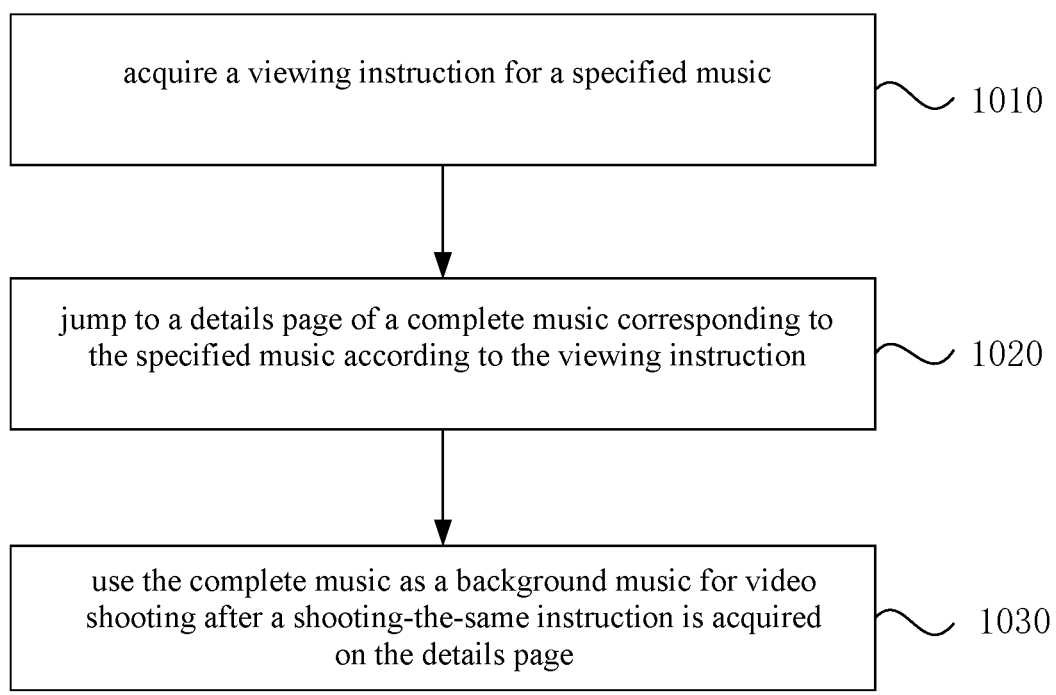
FIG. 1a is a flowchart of a method for selecting a background music for video shooting according to an embodiment of the present disclosure.

The present disclosure will be described below in combination with the accompanying drawings and embodiments. The specific embodiments described herein are merely illustrative of the present disclosure, and are not intended to limit the present disclosure. In addition, for the convenience of description, only some of the structures that are related to the present disclosure, not all the structures, are shown in the drawings.

FIG. 1 is a flowchart of a method for selecting a background music for video shooting according to an embodiment of the present disclosure. The present embodiment is applicable to a situation where a background music is to be selected for video shooting, and the method may be performed by an apparatus for selecting a background music for video shooting. The apparatus may be implemented by software and/or hardware, and may be configured in a terminal device such as a mobile phone and/or a tablet computer. As shown in FIG. 1a, the method includes the following steps of 1010, 1020 and 1030.

Step 1010: acquiring a viewing instruction for a specified music.

In the present embodiment, a user may browse, on a browsing page, videos or music shared by other people. The browsing page may include a video playing page and a music browsing page. The music browsing page includes music classification information, a list of popular songs, and/or a list of local music, etc., and several pieces of music can be browsed on the music browsing page.

The specified music refers to music provided to the user on the browsing page, and may include background music of the video played in the video playing page, and music selected by the user to view in the music browsing page. A short video application may refer to a video application that provides video shooting and processing functions as well as social functions. When the user is browsing the browsing page, he or she may be interested in the specified music and wants to view details information of the specified music. In an embodiment, it may be implemented by setting a related control on the browsing page of the short video application, such as setting a music viewing control on the browsing page of the short video application. The user may input a viewing instruction for the specified music by performing a triggering operation on the music viewing control corresponding to the specified music. The triggering operation is used as the user's viewing instruction for the specified music. In an embodiment, the music viewing control may be designed as a music viewing icon, and the user may input the viewing instruction for the specified music by clicking on the music viewing icon. The expression of the music viewing icon may be set according to the actual situation, and is not specifically limited herein. In an embodiment, the music viewing icon may be a compact disc.

Step 1020: jumping to a details page of a complete music corresponding to the specified music according to the viewing instruction.

In this embodiment, when the user triggers the music viewing icon to generate the viewing instruction, the page of the short video application jumps to a details page of a complete music corresponding to the specified music. The details page of the complete music includes details information and an operation control of the complete music corresponding to the specified music. The details information includes the name of the complete music, the corresponding original musician logo, and the number of people who have used the complete music to shoot video. Only the details information corresponding to the complete music can be seen on the details page of the complete music. In an embodiment, a shooting-the-same operation control may be set on the details page. The shooting-the-same operation control is configured to input a shooting-the-same instruction. The shooting-the-same instruction is an instruction configured to enter the video shooting page corresponding to the specified music, and use the complete music as the background music for video shooting. The user may input the shooting-the-same instruction by performing a triggering operation on the shooting-the-same operation control, so that the video shooting page corresponding to the specified music is directly entered and the complete music is used as the background music for video shooting.

In an embodiment, the shooting-the-same operation control may be designed as a shooting-the-same operation icon. The user may directly enter the video shooting page corresponding to the specified music by clicking on the shooting-the-same operation icon so that the complete music is used as the background music for video shooting. The expression of shooting-the-same operation icon may be set according to the actual situation, and is not limited herein.

Step 1030: using the complete music as a background music for video shooting after a shooting-the-same instruction is acquired on the details page.

In this embodiment, when a shooting-the-same instruction from the user is acquired on the details page, the details page of the complete music corresponding to the specified music jumps to the video shooting page corresponding to the specified music. A shooting control may be set on the video shooting page. In an embodiment, the shooting control may be designed as a shooting icon. When the user presses and holds the shooting icon, the complete music begins to be used as the background music for video shooting until the user no longer holds the shooting icon, and then the video shooting stops.

Figure 1B:
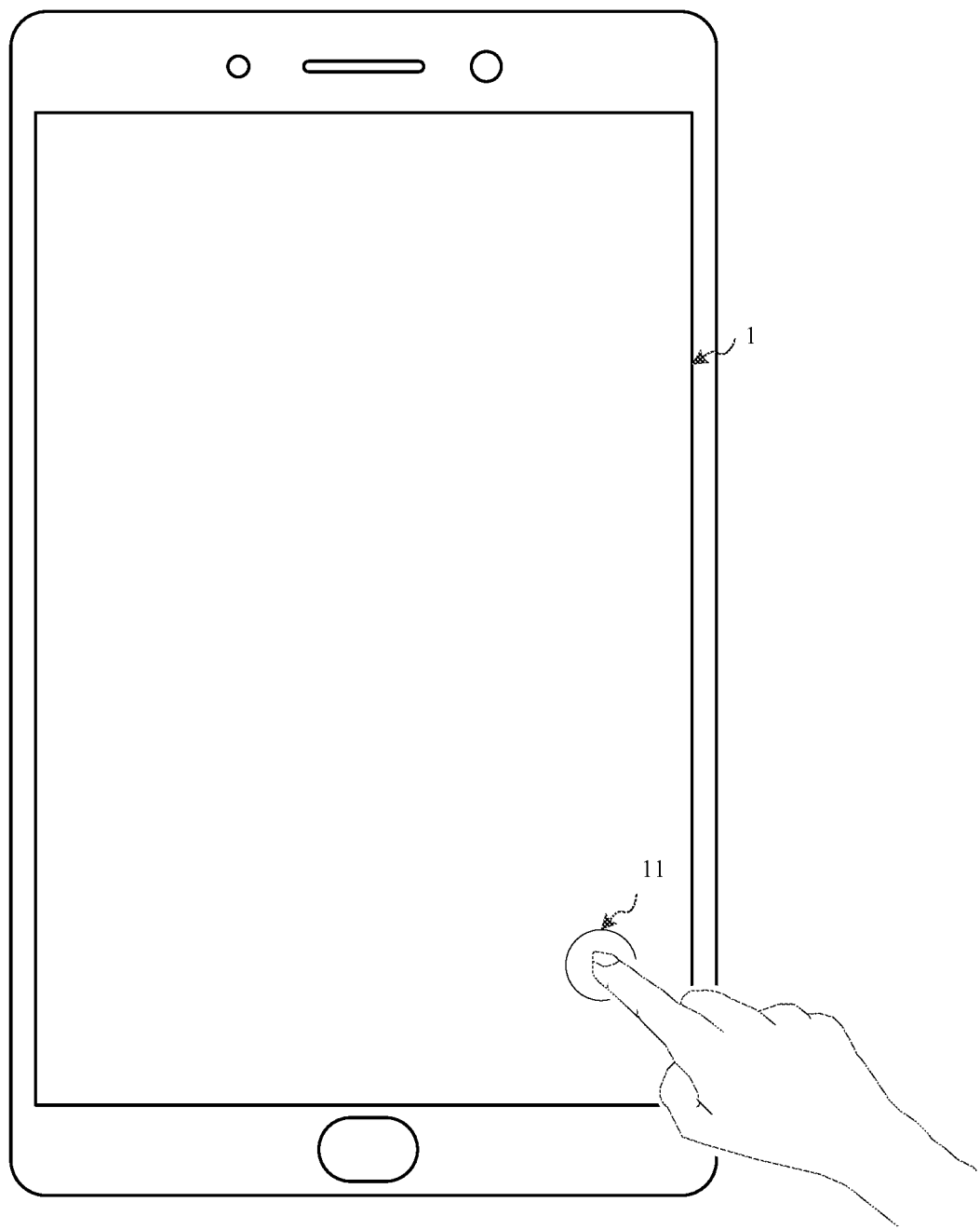
FIG. 1b is a schematic view of a layout of a page of a short video application according to an embodiment of the present disclosure.
Figure 1C:
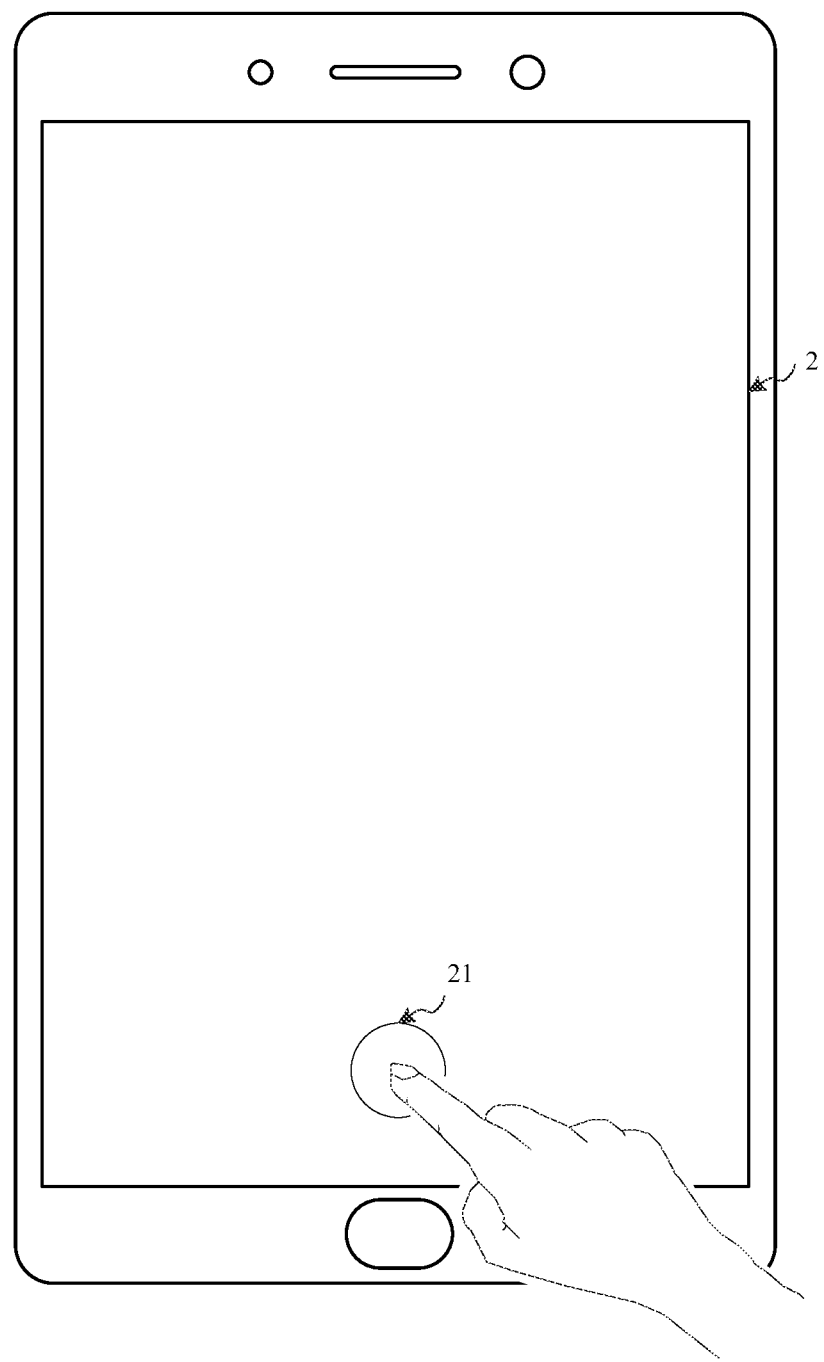
FIG. 1c is a schematic view of a layout of a details page of a short video application according to an embodiment of the present disclosure.
Figure 1D:
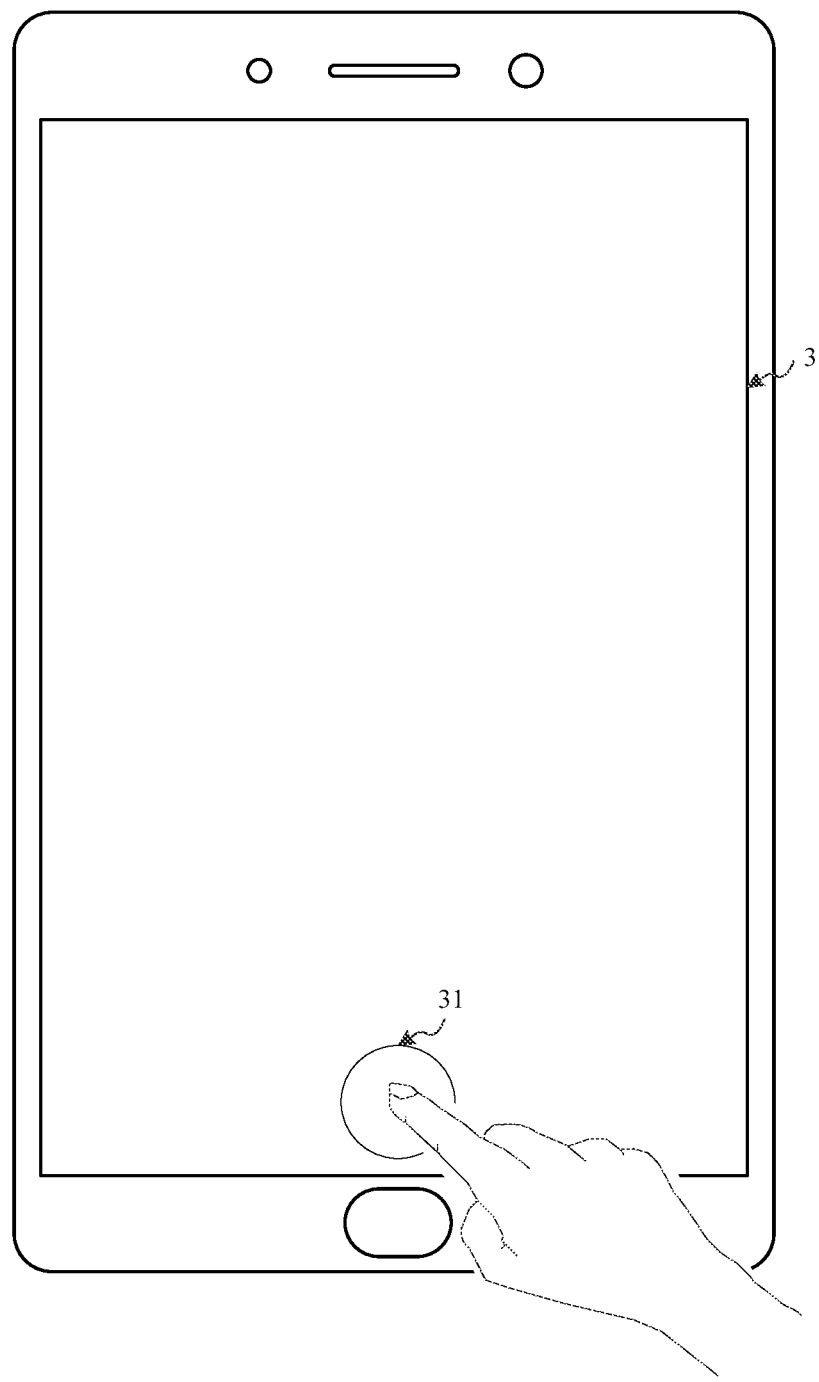
FIG. 1d is a schematic view of a layout of a video shooting page of a short video application according to an embodiment of the present disclosure.

In an embodiment, as shown in FIG. 1b, a schematic view of a layout of a page 1 of a short video application in a technical solution according to an embodiment of the present disclosure is presented. Page 1 may include a music viewing icon 11. FIG. 1c is a schematic view of a layout of a details page 2 of a short video application in a technical solution according to an embodiment of the present disclosure. The details page 2 may include a shooting-the-same operation icon 21. FIG. 1d is a schematic view of a layout of a video shooting page 3 of a short video application in a technical solution according to an embodiment of the present disclosure. The video shooting page 3 may include a shooting icon 31. The user may input a viewing instruction for a specified music by clicking on the music viewing icon 11 corresponding to the specified music on the page 1, and then the page 1 of the short video application jumps to the details page 2 of the complete music corresponding to the specified music. The user may input a shooting-the-same instruction by clicking on the shooting-the-same operation icon 21 on the details page 2, and the details page 2 jumps to the video shooting page 3 corresponding to the specified music. When the user presses and holds the shooting icon 31, the complete music begins to be used as the background music for video shooting until the user no longer holds the shooting icon 31, and then the video shooting stops.

In the technical solution of this embodiment, the details page of the complete music corresponding to the specified music is jumped to, according to the viewing instruction for the specified music; after the shooting-the-same instruction is acquired on the details page, the complete music is used as the background music for video shooting. As such, the problem that the short video shooting technology in the related art cannot meet people's increasing demands on short video shooting in terms of convenience is solved, the specified music is conveniently used for video shooting, the user's operations are saved, and the convenience of selecting the background music during video shooting is improved.

In an embodiment, on the basis of the above described technical solution, the details page further includes: an original musician logo corresponding to the complete music, and a cover of the video shot by using the complete music; and the video shot by using the complete music includes: a popular video and/or the latest video.

Figure 1E:
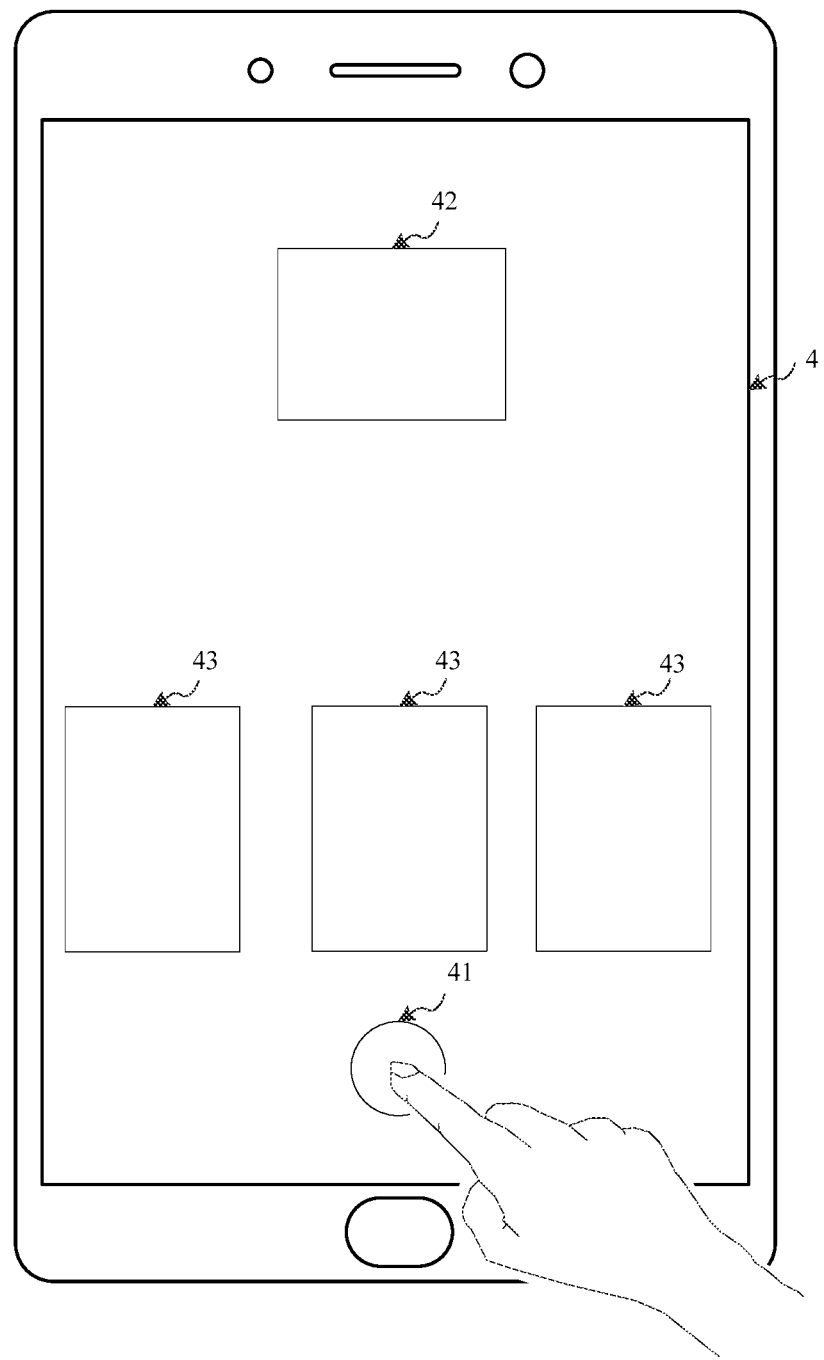
FIG. 1e is a schematic view of a layout of a details page of another short video application according to an embodiment of the present disclosure.

As shown in FIG. 1*e*, a schematic view of a layout of a details page 4 of another short video application in a technical solution according to an embodiment of the present disclosure is presented. The details page 4 may include a shooting-the-same operation icon 41, an original musician logo 42 corresponding to the complete music, and a cover 43 of the video shot by using the complete music. The user may input a viewing instruction for a specified music by clicking on the music viewing icon 11 corresponding to the specified music on the page 1, and the page 1 of the short video application jumps to the details page 4 of the complete music corresponding to the specified music. The user may click on the shooting-the-same operation icon 41 on the details page 4 so that the details page 4 jumps to the video shooting page 3 corresponding to the specified music. The user may browse information content of the musician corresponding to the complete music by clicking on the original musician logo 42. The user may view information content of the video shot by using the complete music by clicking on the cover 43 of the video shot by using the complete music.

In the embodiment of the present disclosure, musician information and video information related to the complete music can be conveniently provided to the user. As such, after the user enters the details page, he or she can see the musician information and video information related to the complete music in the first time, and if the user is interested in the music or video related to the complete music, he or she can directly click on the original musician logo corresponding to the complete music, or he or she can browse information content of the musician or view information content of the video shot by using the complete music by using the cover of the video, without having to search for the musician information and video information related to the complete music, thereby simplifying the user's operation steps in acquiring the related musician information and video information.

Figure 2A:
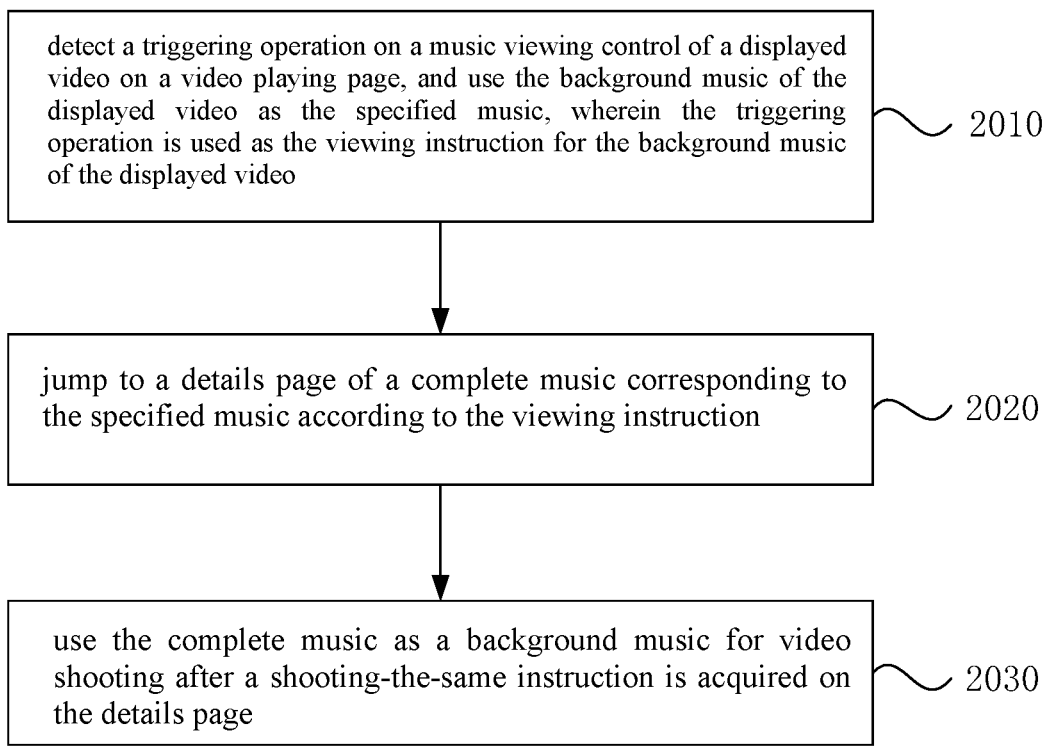
FIG. 2a is a flowchart of another method for selecting a background music for video shooting according to an embodiment of the present disclosure.

FIG. 2*a* is a flowchart of another method for selecting a background music for video shooting according to an embodiment of the present disclosure. This embodiment is described on the basis of the foregoing embodiment. In this embodiment, the acquiring the viewing instruction for the specified music includes: detecting a triggering operation on a music viewing control of a displayed video on the video playing page, and using the background music of the displayed video as the specified music, wherein the triggering operation is used as the viewing instruction for the background music of the displayed video.

As shown in FIG. 2*a*, the method includes the following steps of 2010, 2020 and 2030.

Step 2010: detecting a triggering operation on a music viewing control of a displayed video on a video playing page, and using a background music of the displayed video as the specified music, wherein the triggering operation is used as the viewing instruction for the background music of the displayed video.

In this embodiment, when the user views, on the video playing page, a video shared by others, he or she may be interested in the background music of the video, and wants to use the background music to shoot a video. In the related art, typically, music information such as the name of the music used by the background music is acquired, and a search is made in a music library according to the music information so as to find the music used by the background music, and then the music is selected as the background music for video shooting. In the process of implementing the present disclosure, it is found that the following defects exist in the related art: in a case that the user is watching a video, he or she may be interested in the background music of the video and wants to use the background music to shoot a video; but if the user does not know music information such as the name of the music used by the background music, it is very difficult to find the music in the music library and shoot a video. In embodiments of the present disclosure, a music viewing control of a displayed video may be set on the video playing page. The user may input a viewing instruction for the background music of the displayed video by performing a triggering operation on the music viewing control of the displayed video. When a triggering operation on the music viewing control of the displayed video is detected on the video playing page, the background music of the displayed video is used as the specified music, and the triggering operation is used as the viewing instruction for the background music of the displayed video. In an embodiment, the music viewing control of the displayed video may be designed as a music viewing icon, and the user may input the viewing instruction for the background music of the displayed video by clicking on the music viewing icon of the displayed video. The expression of the music viewing icon may be set according to the actual situation, and is not limited herein. In an embodiment, the music viewing icon may be a compact disc.

Step 2020: jumping to a details page of a complete music corresponding to the specified music according to the viewing instruction.

Step 2030: using the complete music as a background music for video shooting after a shooting-the-same instruction is acquired on the details page.

Figure 2B:
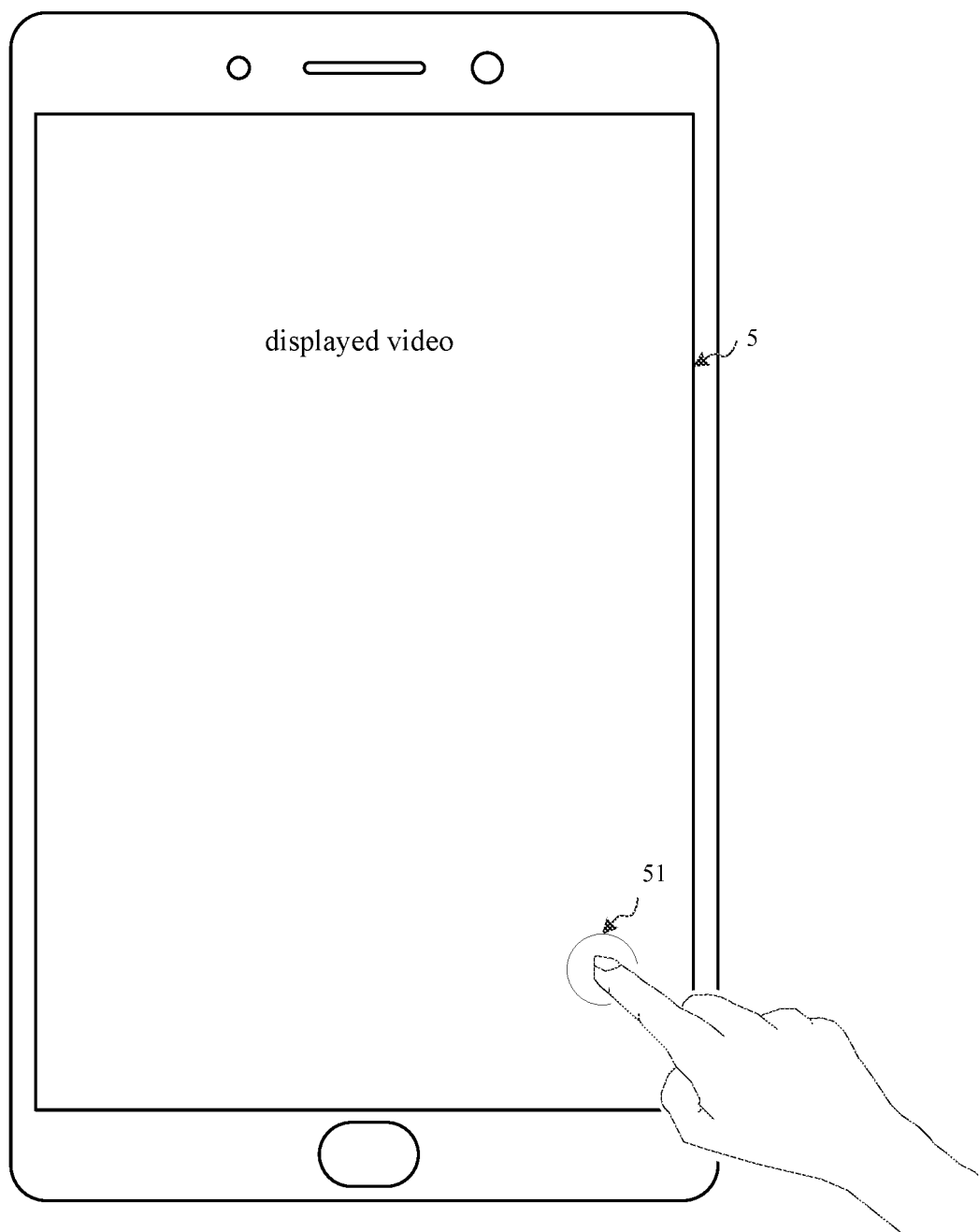
FIG. 2b is a schematic view of a layout of a video playing page of a short video application according to an embodiment of the present disclosure.

In an embodiment, as shown in FIG. 2*b*, a schematic view of a layout of a video playing page 5 of a short video application in a technical solution according to an embodiment of the present disclosure is presented. The video playing page 5 may include a music viewing icon 51. The user may input a viewing instruction for the specified music by clicking on the music viewing icon 51 corresponding to the specified music on the video playing page 5, and the video playing page 5 of the short video application jumps to the details page of the complete music corresponding to the specified music. After a triggering operation on the shooting-the-same operation control is detected on the details page, the complete music is used as the background music for video shooting.

In the technical solution of the embodiment, a triggering operation on the music viewing control of the displayed video is detected on the video playing page, the background music of the displayed video is used as the specified music, wherein the triggering operation is used as a viewing instruction for the background music of the displayed video; the details page of the complete music corresponding to the specified music is jumped to according to the viewing instruction for the specified music, and after a triggering operation on the shooting-the-same operation control is detected on the details page, the complete music is used as the background music for video shooting. As such, the following problem in the short video shooting technology is solved: if the user does not know music information such as the name of the music used by the background music of the displayed video, it is very difficult to find the music in the music library and shoot a video. The background music of the displayed video can be conveniently used for video shooting, and user's operations are saved.

In an embodiment, on the basis of the foregoing technical solution, the video playing page includes at least two music viewing controls; and the detecting the triggering operation on the music viewing control of the displayed video on the video playing page includes: detecting a triggering operation on one of the at least two music viewing controls of the displayed video on the video playing page.

In an embodiment, the video playing page is provided with a music scroll position. The music scroll position is configured to scroll-display relevant information of the current video. The music scroll position may be set as the music viewing control, and the user may input a viewing instruction for the background music of the displayed video by clicking on the music scroll position of the displayed video. In an embodiment, the at least two music viewing controls include a music scroll position and a music viewing icon. The user may input a viewing instruction for the background music of the displayed video by clicking on the music scroll position or the music viewing icon of the displayed video. In a case that a triggering operation on the music scroll position or the music viewing icon of the displayed video is detected on the video playing page, the background music of the displayed video is used as the specified music, and the triggering operation is used as the viewing instruction for the background music of the displayed video.

Figure 2C:
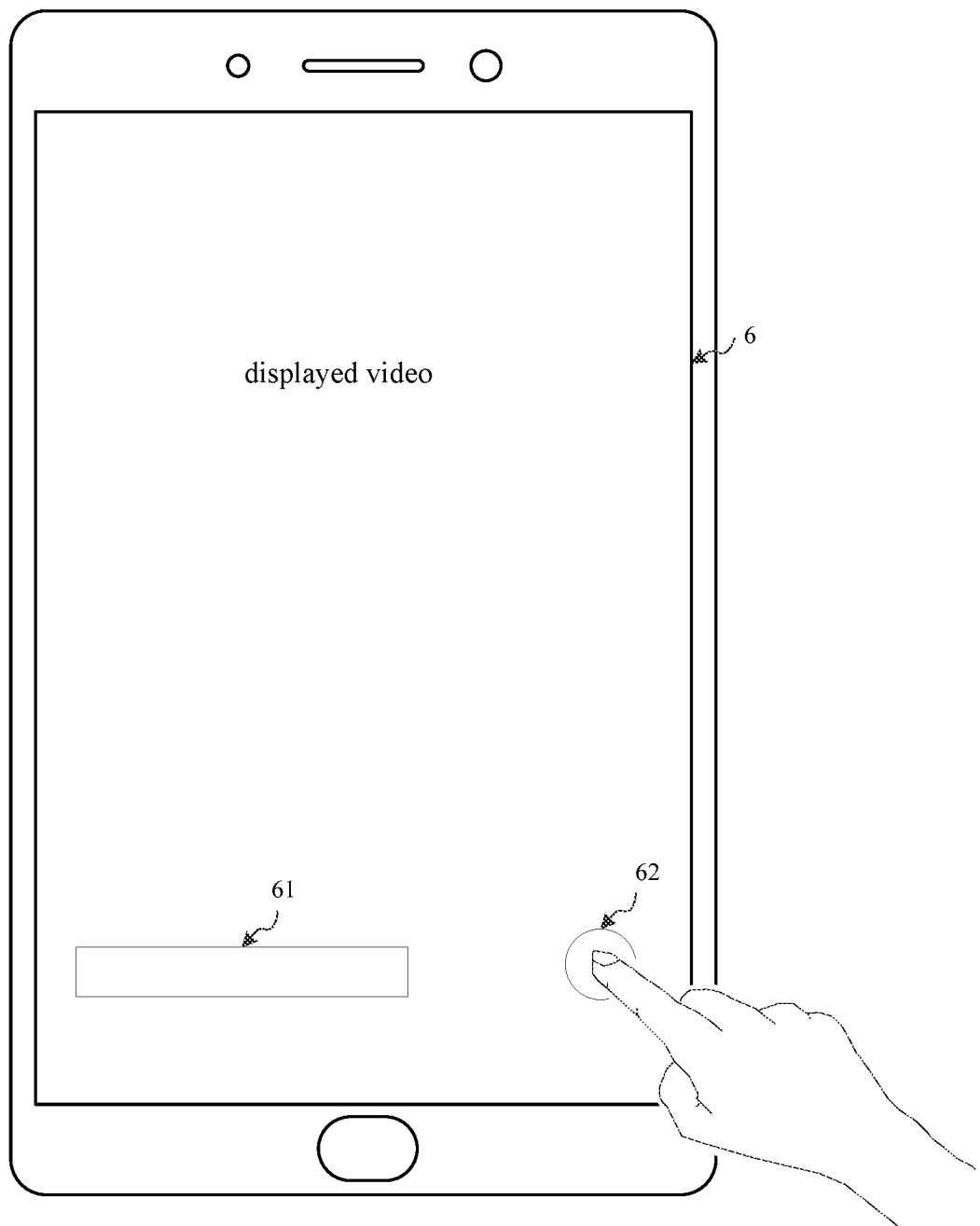
FIG. 2c is a schematic view of a layout of a video playing page of another short video application according to an embodiment of the present disclosure.

In an embodiment, as shown in FIG. 2c, a schematic view of a layout of a video playing page 6 of another short video application in a technical solution according to an embodiment of the present disclosure is presented. The video playing page 6 may include a music scroll position 61 and a music viewing icon 62. The user may input a viewing instruction for the background music of the displayed video by clicking on the music scroll position or the music viewing icon of the displayed video, and the video playing page 6 of the short video application jumps to the details page of the complete music corresponding to the background music of the displayed video. After a user's triggering operation on the shooting-the-same operation control is detected on the details page, the complete music is used as the background music for video shooting.

In an embodiment of the present disclosure, at least two music viewing controls are provided, and a viewing instruction for the background music of the displayed video can be conveniently input by a triggering operation on one of the at least two music viewing controls of the displayed video.

Figure 3A:
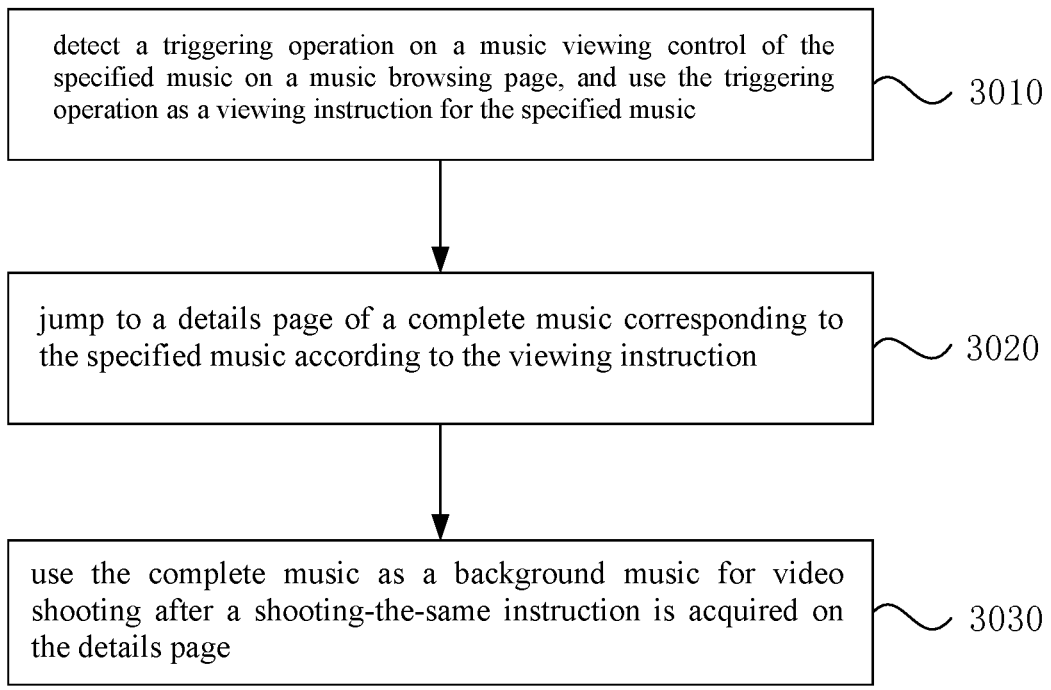
FIG. 3a is a flowchart of another method for selecting a background music for video shooting according to an embodiment of the present disclosure.

FIG. 3a is a flowchart of another method for selecting a background music for video shooting according to an embodiment of the present disclosure. This embodiment is described on the basis of the foregoing embodiment. In this embodiment, the acquiring the viewing instruction for the specified music includes: detecting a triggering operation on a music viewing control of the specified music on a music browsing page, and using the triggering operation as a viewing instruction for the specified music.

As shown in FIG. 3a, the method includes the following steps of 3010, 3020 and 3030.

Step 3010: detecting a triggering operation on a music viewing control of the specified music on a music browsing page, and using the triggering operation as a viewing instruction for the specified music.

In an embodiment, the music browsing page includes: music information of at least one piece of music, and a music viewing control corresponding to the music.

In an embodiment, when the user browses music on the music browsing page, he or she may be interested in the music and wants to use the background music to shoot a video. In the embodiments of the present disclosure, a music viewing control corresponding to the music may be set on the music browsing page. The user may input a viewing instruction for the music corresponding to the music viewing control by performing a triggering operation on the music viewing control. When a triggering operation on the music viewing control of the specified music is detected on the music browsing page, the music corresponding to the music viewing control is used as the specified music, and the triggering operation is used as the viewing instruction for the specified music. In an embodiment, the music viewing control corresponding to the music may be designed as a music viewing icon, and the user may input a viewing instruction for the music by clicking on the music viewing icon corresponding to the music. The expression of the music viewing icon may be set according to the actual situation, and is not limited herein. In an embodiment, the music viewing icon may be a compact disc.

Step 3020: jumping to a details page of a complete music corresponding to the specified music according to the viewing instruction.

Step 3030: using the complete music as a background music for video shooting after a shooting-the-same instruction is acquired on the details page.

Figure 3B:
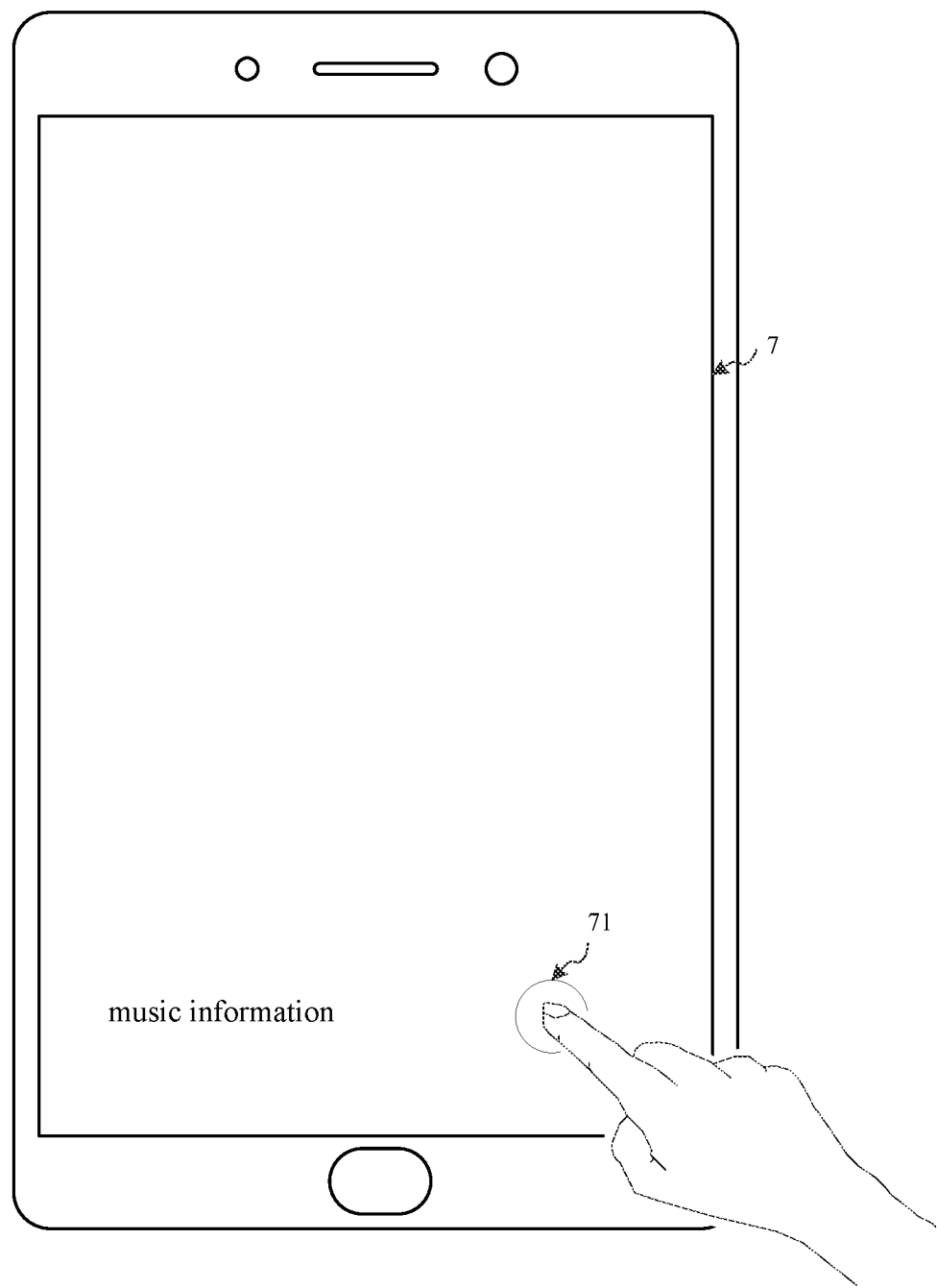
FIG. 3b is a schematic view of a layout of a music browsing page of a short video application according to an embodiment of the present disclosure.

In an embodiment, as shown in FIG. 3b, a schematic view of a layout of a music browsing page 7 of a short video application in a technical solution according to an embodiment of the present disclosure is presented. The music browsing page 7 may include music information of at least one piece of music, and a music viewing icon 71 corresponding to the music. The user may input a viewing instruction for the music by clicking on the music viewing icon 71 corresponding to the music, and the music browsing page 7 of the short video application jumps to a details page of a complete music corresponding to the specified music. After a user's triggering operation on the shooting-the-same operation control is detected on the details page, the complete music is used as the background music for video shooting.

In the technical solution of this embodiment, a triggering operation on the music viewing control of the specified music is detected on the music browsing page, the triggering operation is used as a viewing instruction for the specified music, a details image of a complete music corresponding to the specified music is jumped to according to the viewing instruction for the specified music, and the complete music is used as the background music for video shooting after a user's triggering operation on the shooting-the-same operation control is detected on the details page. As such, the following problem in the short video shooting technology is solved: when the user enters the details page of the music, if he or she want to use the music to shoot a video, it is necessary to return to the music browsing interface to select the background music for video shooting, which results in a complicated operation. The current music can be directly used as the background music for video shooting, which saves the user's operation.

Figure 4A:
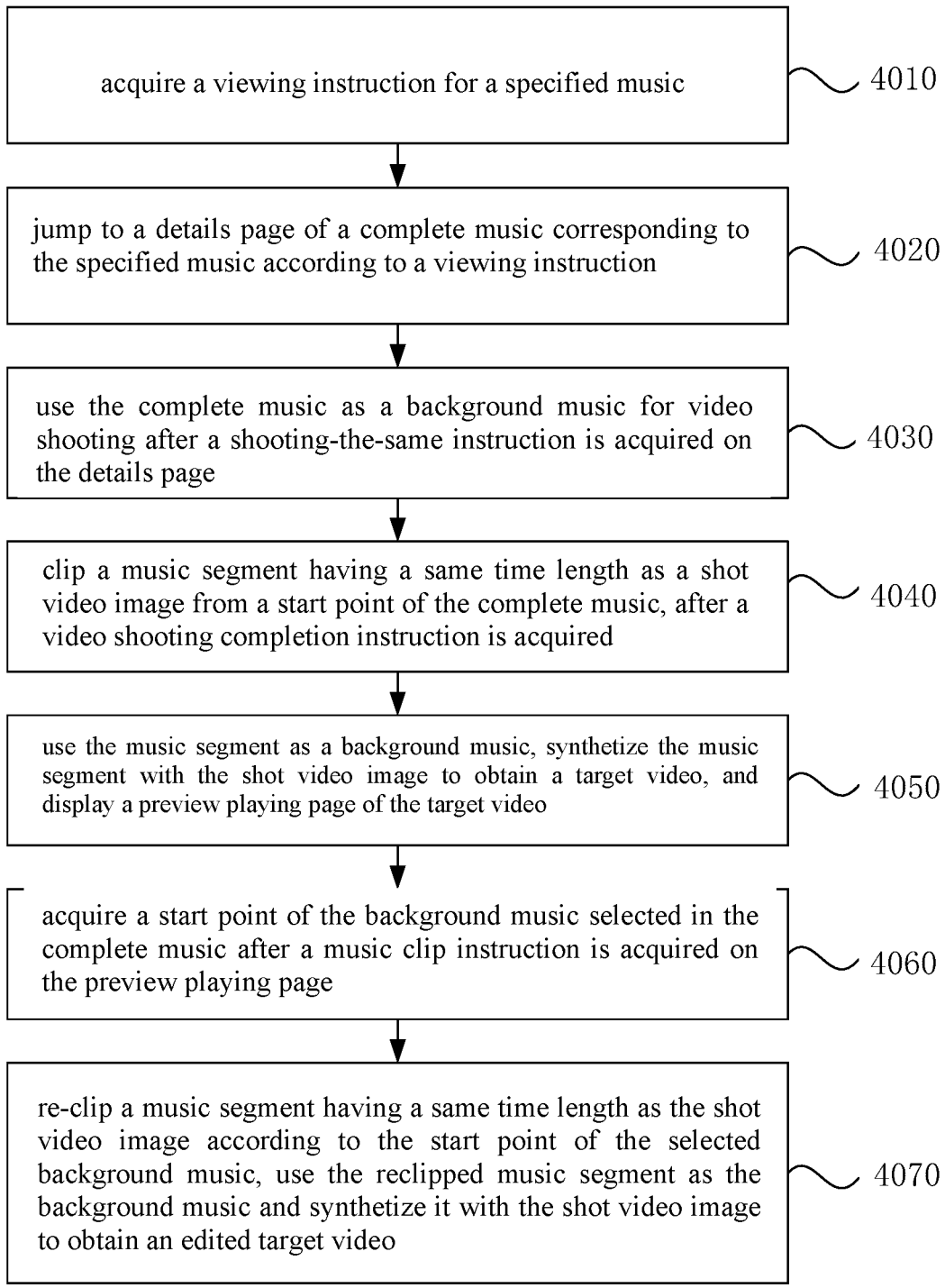
FIG. 4a is a flowchart of another method for selecting a background music for video shooting according to an embodiment of the present disclosure.

FIG. 4a is a flowchart of another method for selecting a background music for video shooting according to an embodiment of the present disclosure. The embodiment is applicable to a case where a background music is to be selected for video shooting. As shown in FIG. 4a, the method includes the following steps of 4010, 4020, 4030, 4040, 4050, 4060 and 4070.

Step 4010: acquiring a viewing instruction for a specified music.

Step 4020: jumping to a details page of a complete music corresponding to the specified music according to a viewing instruction.

Step 4030: using the complete music as a background music for video shooting after a shooting-the-same instruction is acquired on the details page.

Step 4040: clipping a music segment having a same time length as a shot video image from a start point of the complete music, after a video shooting completion instruction is acquired.

In an embodiment, when a user's triggering operation on the shooting-the-same operation control is detected on the details page, the details page of the complete music corresponding to the specified music jumps to the video shooting page corresponding to the specified music. A shooting control may be set on the video shooting page. In an embodiment, the shooting control may be designed as a shooting icon. When the user presses and holds the shooting icon, the complete music begins to be used as the background music for video shooting until the user no longer holds the shooting icon, and the video shooting stops. After a video shooting completion instruction is acquired, a music segment having a same time length as the shot video image is clipped from a start point of the complete music, according to a preset audio clipping algorithm.

In an embodiment, a shooting completion confirmation control may be set on the video shooting page. The user may input the video shooting completion instruction by performing a triggering operation on the shooting completion confirmation control. In an embodiment, the shooting completion confirmation control may be designed as a shooting completion confirmation icon, and the user may input the video shooting completion instruction by clicking on the shooting completion confirmation icon. The expression of the shooting completion confirmation icon may be set according to the actual situation, and is not limited herein.

In an embodiment, a video shooting time is set in advance. Timing begins from when the user presses and holds the shooting icon, and after the video shooting time is reached, the video shooting completion instruction is automatically generated.

Step 4050: using the music segment as a background music, synthetizing the music segment with the shot video image to obtain a target video, and displaying a preview playing page of the target video.

In an embodiment, the music segment having the same time length as the shot video image clipped from the start point of the complete music is used as the background music and synthetized with the shot video image to obtain a target video, according to a preset video-audio merging algorithm. A preview playing page of the target video is displayed after the target video is obtained. The preview playing page is configured to play the target video.

Step 4060: acquiring a start point of the background music selected in the complete music after a music clip instruction is acquired on the preview playing page.

In this embodiment, the start point of the background music selected by the user is different from the start point of the complete music. The start point of the background music selected by the user is the start point of the music segment selected by the user in the complete music. A music segment in the complete music from the start point and having the same time length as the shot video image is used as the background music.

In an embodiment, a music clip control may be set on the preview playing page. The user may input a music clip instruction by performing a triggering operation on the music clip control. In an embodiment, the music clip control may be designed as a music clip icon, and the user may input the music clip instruction by clicking on the music clip icon. The expression of the music clip icon may be set according to the actual situation, and is not limited herein. In an embodiment, the music clip icon may be a scissors. After the music clip instruction input by the user by clicking on the music clip icon is acquired, a music editing area is displayed on the preview playing page.

The music editing area includes an acoustic spectrum icon of the complete music, and a corresponding start point selection control. The acoustic spectrum icon is configured to represent the acoustic spectrum of the complete music. The acoustic spectrum is a tool configured to describe components contained in the sound and a distribution pattern of the acoustic energy in the tone. The acoustic spectrum may be regarded as a "photograph of sound", which can reflect the relationship between a certain instantaneous frequency and the amplitude of the sound during the sounding process. The abscissa of the acoustic spectrum is the frequency, and the ordinate is the amplitude. The start point selection control is configured to select the start point of the background music on the acoustic spectrum icon of the complete music. In an embodiment, the start point selection control may be designed as a start point selection icon. The expression of the acoustic spectrum icon of the complete music and the start point selection icon may be set according to the actual situation, and is not limited herein.

In an embodiment, the user drags the start point selection icon to select a start point of the background music. A position point in the acoustic spectrum icon of the complete music that corresponds to the position of the start point selection control is the start point of the background music selected by the user.

Step 4070: re-clipping a music segment having a same time length as the shot video image according to the start point of the selected background music, using the reclipped music segment as the background music and synthetizing it with the shot video image to obtain an edited target video.

In this embodiment, after the start point of the background music selected by the user is acquired, a music segment having a same time length as the shot video image is reclipped according to the start point of the background music selected by the user, and the reclipped music segment is used as the background music and synthetized with the shot video image to obtain an edited video. In an embodiment, the edited video is played by the preview playing page.

In an embodiment, a music confirmation control may be set on the music editing area. After an appropriate music segment is selected and the music editing is completed, the user may input a music confirmation instruction by performing a triggering operation on the music confirmation control. In an embodiment, the music confirmation control may be designed as a music confirmation icon, and the user may input a music confirmation instruction by clicking on the music confirmation icon. The expression of the music confirmation icon may be set according to the actual situation, and is not limited herein. After the music confirmation instruction is acquired in the music editing area, the music editing area is no longer displayed on the preview playing page.

Figure 4B:
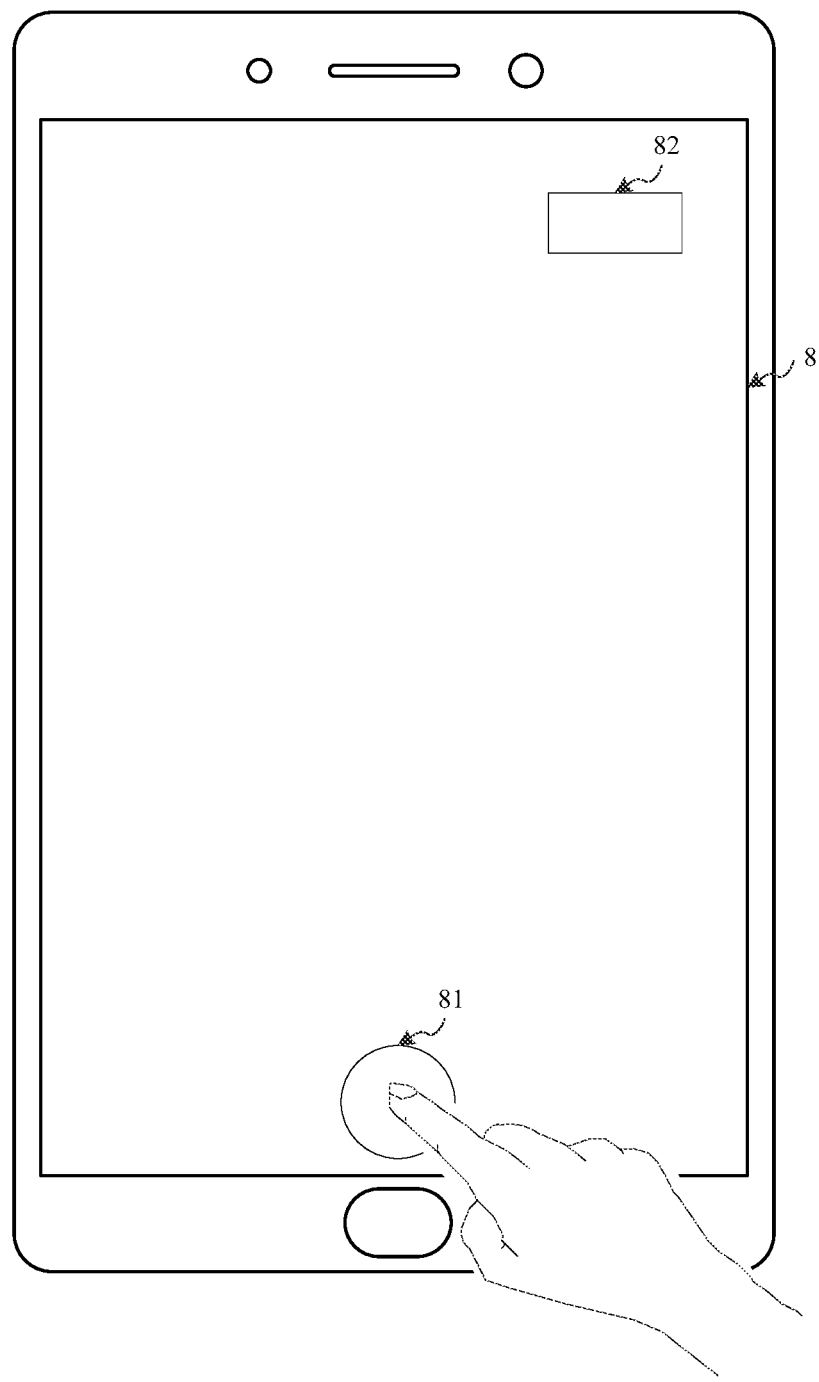
FIG. 4b is a schematic view of a layout of a video shooting page of another short video application according to an embodiment of the present disclosure.
Figure 4C:
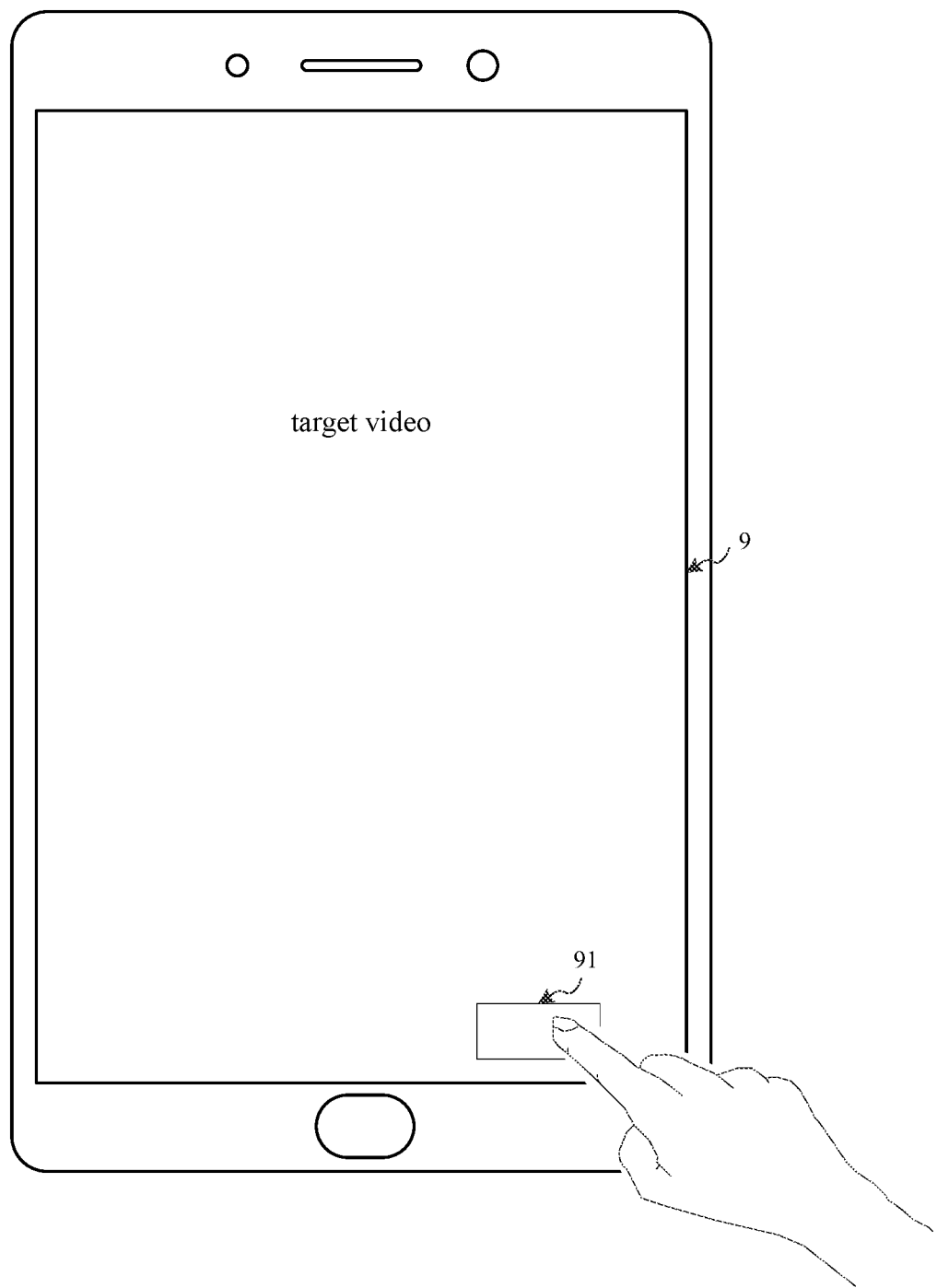
FIG. 4c is a schematic view of a layout of a preview playing page of a short video application according to an embodiment of the present disclosure.
Figure 4D:
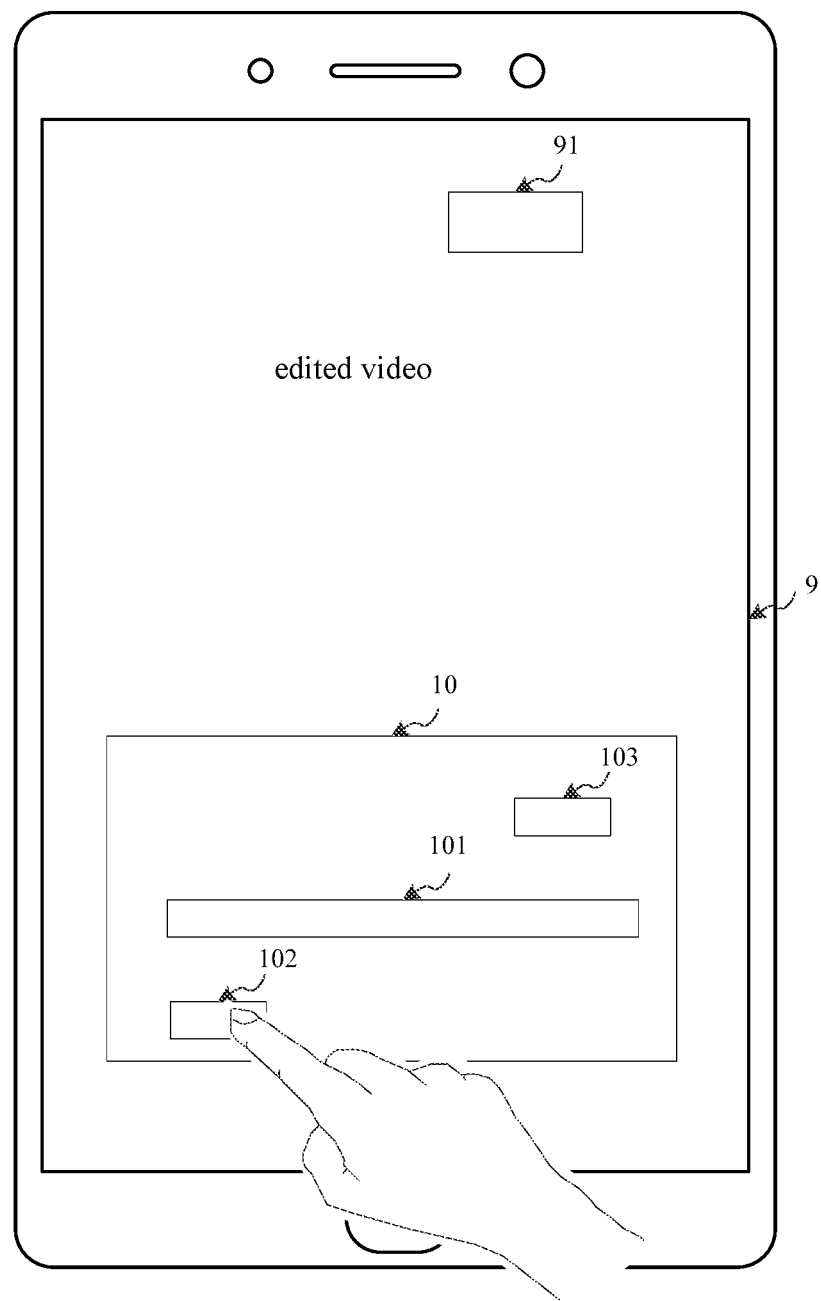
FIG. 4d is a schematic view of a layout of a music editing area of a short video application according to an embodiment of the present disclosure.

In an embodiment, as shown in FIG. 4b, a layout of a video shooting page 8 of another short video application in a technical solution according to an embodiment of the present disclosure is presented. The video shooting page 8 may include a shooting icon 81 and a shooting completion confirmation icon 82. As shown in FIG. 4c, a schematic view of a layout of a preview playing page 9 of a short video application in a technical solution according to an embodiment of the present disclosure is presented. The preview playing page 9 may include a music clip icon 91. As shown in FIG. 4d, a schematic view of a layout of a music editing area 10 of a short video application in a technical solution according to an embodiment of the present disclosure is presented. The music editing area 10 is located on the preview playing page 9. The music editing area 10 may include an acoustic spectrum icon 101 of a complete music, a start point selection icon 102, and a music confirmation icon 103. When the user presses and holds the shooting icon 81, the complete music begins to be used as the background music for video shooting until the user no longer holds the shooting icon 81, and the video shooting stops. After a video shooting completion instruction input by the user by clicking on the shooting completion confirmation icon 82 is acquired, the music segment is used as the background music and is synthetized with the shot video image to obtain a target video, and the preview playing page 9 of the target video is displayed. The target video is played by the preview playing page 9. After the user inputs a music clip instruction by clicking on the music clip icon 91, the music editing area 10 is displayed on the preview playing page 9. The user drags the start point selection icon 102, and a start point of the background music selected by the user is acquired by determining the position of the start point selection icon 102. A music segment having a same time length as the shot video image is re-clipped according to the start point of the background music selected by the user, and the reclipped music segment is used as the background music and synthetized with the shot video image to obtain an edited video. The edited video is played on the preview playing page 9. After the user inputs a music confirmation instruction by clicking on the music confirmation icon 103, the music editing area 10 is no longer displayed on the preview playing page 9.

In the technical solution of this embodiment, a music segment having a same time length as the shot video image clipped from a start point of the complete music is used as the background music, and is synthetized with the shot video image to obtain a target video, and the target video is displayed; after a music clip instruction is acquired, a music editing area is displayed, wherein the music editing area includes an acoustic spectrum of the music and a corresponding music segment selection control; a music segment selected by the user is determined according to the user's dragging operation on the music segment selection control, and the music segment selected by the user is used as the background music and is synthetized with the shot video image to obtain an edited video; the background music of the video can be conveniently edited after the video shooting is completed.

Figure 5:
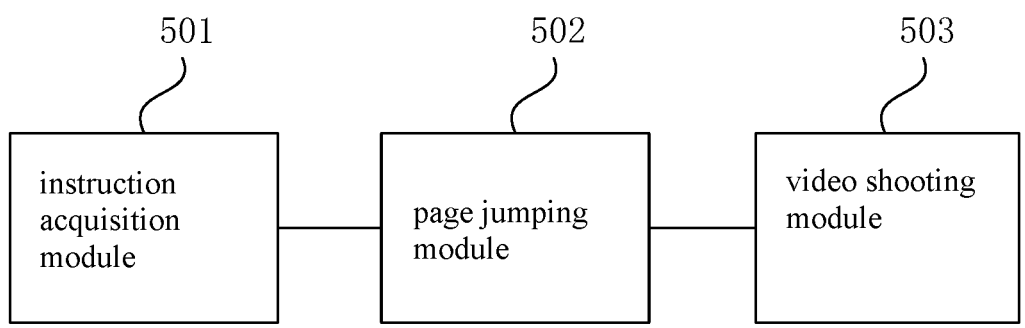
FIG. 5 is a schematic structural view of an apparatus for selecting a background music for video shooting according to an embodiment of the present disclosure.

FIG. 5 is a schematic structural view of an apparatus for selecting a background music for video shooting according to an embodiment of the present disclosure. The present embodiment is applicable to a situation where a background music is to be selected for video shooting. The apparatus may be implemented by software and/or hardware, and may be configured in a terminal device such as a mobile phone and/or a tablet computer. As shown in FIG. 5, the device includes an instruction acquisition module 501, a page jumping module 502, and a video shooting module 503.

In this embodiment, the instruction acquisition module 501 is configured to acquire a viewing instruction for a specified music; the page jumping module 502 is configured to jump to a details page of a complete music corresponding to the specified music according to the viewing instruction; and the video shooting module 503 is configured to use the complete music as a background music for video shooting after a shooting-the-same instruction is acquired on the details page.

In the embodiments of the present disclosure, a details page of a complete music corresponding to a specified music is jumped to according to a viewing instruction for the specified music, and the complete music is used as a background music for video shooting after a shooting-the-same instruction is acquired on the details page. In this way, the problem that the short video shooting technology in the related art cannot meet people's increasing demands on short video shooting in terms of convenience is solved, the specified music can be conveniently used for video shooting, user's operations are saved, and the convenience of background music selection during video shooting is improved.

In an embodiment, on the basis of the foregoing technical solution, the instruction acquisition module 501 may include: a first operation detection unit configured to detect a triggering operation on a music viewing control of a displayed video on a video playing page, and use the background music of the displayed video as the specified music, wherein the triggering operation is used as the viewing instruction for the background music of the displayed video; or a second operation detection unit configured to detect a triggering operation on a music viewing control of the specified music on a music browsing page, and use the triggering operation on the music viewing control of the specified music as the viewing instruction for the specified music.

In an embodiment, on the basis of the foregoing technical solution, the video playing page may include at least two music viewing controls.

In an embodiment, on the basis of the foregoing technical solution, the first operation detection unit is configured to detect the triggering operation on the music viewing control of the displayed video on the video playing page by detecting a triggering operation on one of at least two music viewing controls of the displayed video on the video playing page.

In an embodiment, on the basis of the foregoing technical solution, the apparatus may further include: a music clipping module, configured to clip a music segment having a same time length as a shot video image from a start point of the complete music, after a video shooting completion instruction is acquired; and a target video acquisition module, configured to use the music segment as a background music, synthesize the music segment with the shot video image to obtain a target video, and display a preview playing page of the target video.

In an embodiment, on the basis of the foregoing technical solution, the apparatus may further include: a start point acquisition module, configured to acquire a start point of the background music selected in the complete music after a music clip instruction is acquired on the preview playing page; and a video editing module configured to re-clip a music segment having a same time length as the shot video image according to the start point of the selected background music, use the reclipped music segment as the background music and synthesize it with the shot video image to obtain an edited target video.

In an embodiment, on the basis of the foregoing technical solution, the details page may further include: an original musician logo corresponding to the complete music, and a cover of the video shot by using the complete music.

In an embodiment, on the basis of the foregoing technical solution, the video shot by using the complete music may include: a popular video and/or the latest video.

The apparatus for selecting a background music for video shooting provided by the embodiment of the present disclosure may perform the method for selecting a background music for video shooting provided by any embodiment of the present disclosure, and has corresponding functional modules for performing the method and an advantageous effect.

Figure 6:
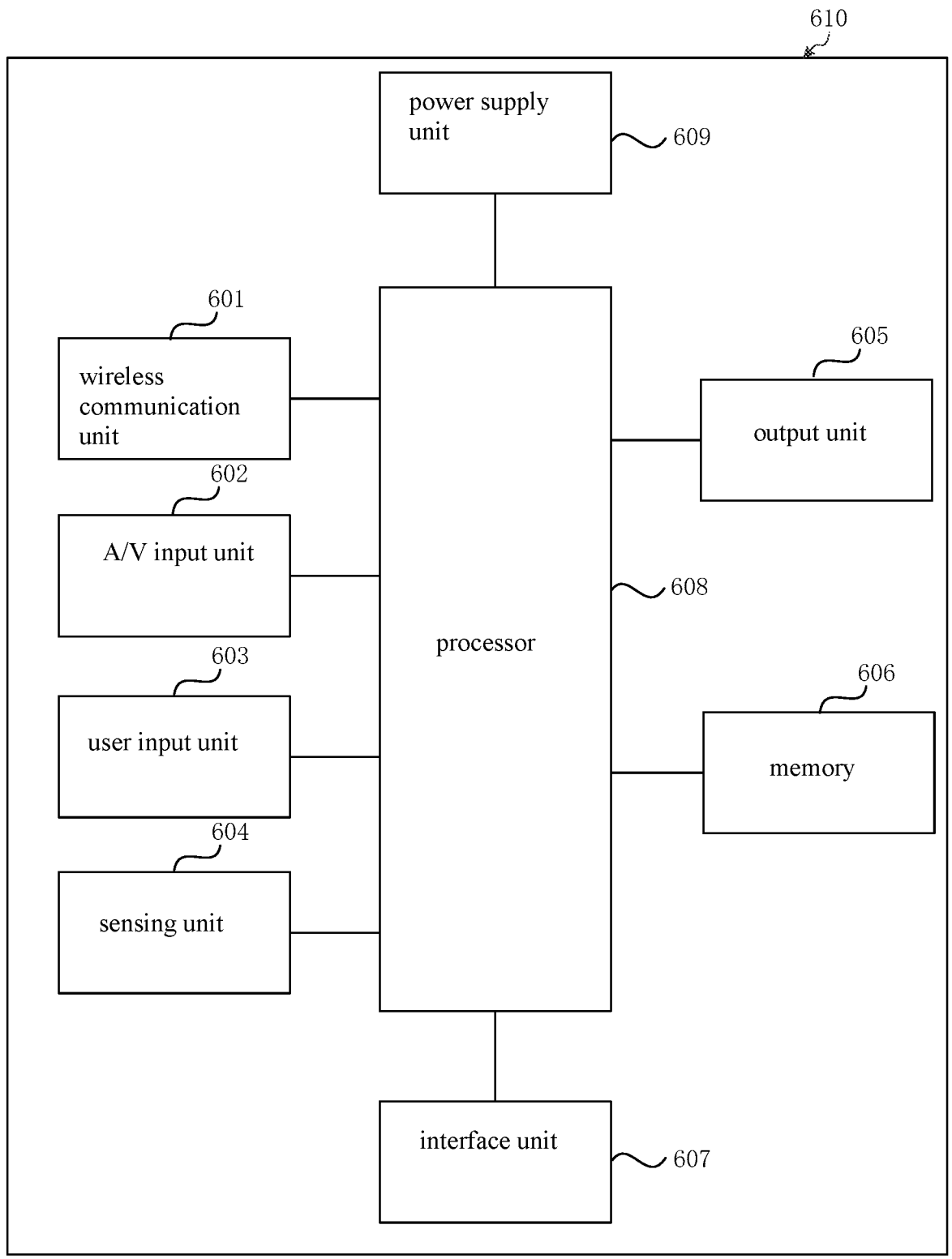
FIG. 6 is a schematic structural view of a terminal device according to an embodiment of the present disclosure.

FIG. 6 is a schematic structural view of a terminal device according to an embodiment of the present disclosure. The terminal device may be implemented in various forms, and the terminal device of the present disclosure may for example include, but is not limited to, mobile terminal devices such as a mobile phone, a smart phone, a notebook computer, a digital broadcast receiver, a personal digital assistant (PDA), a tablet computer (Portable Android Device (PAD), a portable multimedia player (PMP), a navigation device, an in-vehicle terminal device, an in-vehicle display terminal, an in-vehicle electronic rearview mirror and the like, as well as fixed terminal devices such as a digital television (TV), a desktop computer and the like.

As shown in FIG. 6, a terminal device 610 may include a wireless communication unit 601, an audio/video (A/V) input unit 602, a user input unit 603, a sensing unit 604, an output unit 605, a memory 606, an interface unit 607, a processor 608, a power supply unit 609, and the like. FIG. 6 shows a terminal device having a variety of components, but it is not required to implement all of the illustrated components. Instead, more or fewer components may be implemented.

In an embodiment, the wireless communication unit 601 allows for radio communication between the terminal device 610 and a wireless communication system or network. The A/V input unit 602 is configured to receive an audio or video signal. The user input unit 603 may be configured to generate key input data in accordance with a command input by the user to control various operations of the terminal device. The sensing unit 604 is configured to detect the current state of the terminal device 610, the position of the terminal device 610, the presence or absence of a user's touch input to the terminal device 610, the orientation of the terminal device 610, acceleration or deceleration movement and direction of the terminal device 610, and the like, and to generate a command or signal for controlling the operation of the terminal device 610. The interface unit 607 serves as an interface through which at least one external device can connect with the terminal device 610. The output unit 605 is configured to provide an output signal in a visual, audio and/or tactile form. The memory 606 may be configured to store a software program executed by the processor 608 for processing and controlling operations, and the like, or may temporarily store data that has been output or is to be output. The memory 606 may include at least one type of storage medium. Moreover, the terminal device 610 may cooperate with a network storage device that performs a storage function of the memory 606 through a network connection. The processor 608 typically controls the overall operation of the terminal device. Additionally, the processor 608 may include a multimedia module configured to reproduce or play back multimedia data. The processor 608 may perform a pattern recognition processing to recognize a handwriting input or a picture drawing input performed on a touch screen as a character or an image. The power supply unit 609 receives external power or internal power under the control of the processor 608, and provides appropriate power required to operate at least one element and component.

The processor 608, by executing a program stored in the memory 606, performs at least one functional application and data processing, for example, to implement a method for selecting a background music for video shooting provided by any embodiment of the present disclosure. For example, the method may include: acquiring a viewing instruction for a specified music; jumping to a details page of a complete music corresponding to the specified music according to the viewing instruction; and using the complete music as a background music for video shooting after a shooting-the-same instruction is acquired on the details page.

An embodiment of the present disclosure further provides a computer readable storage medium, on which a computer program is stored, wherein when the program is executed by a processor, a method for selecting a background music for video shooting provided by any embodiment of the present disclosure is implemented. For example, the method may include: acquiring a viewing instruction for a specified music; jumping to a details page of a complete music corresponding to the specified music according to the viewing instruction; and using the complete music as a background music for video shooting after a shooting-the-same instruction is acquired on the details page.

The computer storage medium of the embodiment of the present disclosure may be any combination of one or more computer readable mediums. The computer readable medium may be a computer readable signal medium or a computer readable storage medium. The computer readable storage medium may for example be, but not limited to, an electrical, magnetic, optical, electromagnetic, infrared, or semiconductor system, apparatus, or device, or any combination of the above. More specific examples (a non-exhaustive list) of the computer readable storage medium include: an electrical connection having one or more wires, a portable computer disk, a hard disk, a Random Access Memory (RAM), a Read-Only Memory (ROM), an Erasable Programmable Read-Only Memory (EPROM or Flash), an optical fiber, a Compact Disc Read-Only Memory (CD-ROM), an optical storage device, a magnetic storage device, or any suitable combination of the above. In the present disclosure, the computer readable storage medium may be any tangible medium that contains or stores a program which can be used by or used in combination with an instruction execution system, apparatus, or device.

The computer readable signal medium may include data signals propagated in a baseband or as part of a carrier, and a computer readable program code is carried in the computer readable signal medium. Such propagated data signals can take a variety of forms including, but not limited to, electromagnetic signals, optical signals, or any suitable combination of them. The computer readable signal medium may also be any computer readable medium other than a computer readable storage medium, and the computer readable medium may send, propagate or transmit a program used by or used in combination with an instruction execution system, apparatus, or device.

The program code contained in the computer readable medium may be transmitted by any suitable medium including but not limited to, wireless means, wire, optical cable, radio frequency (RF), and the like, or any suitable combination of the above.

The computer program code for performing the operations of the present disclosure may be written in one or more programming languages or combinations thereof, including an object-oriented programming language such as Java, Smalltalk, C++, Ruby, Go, and conventional procedural programming languages such as the "C" language or similar programming languages. The program code may be executed entirely on the user's computer, partly on the user's computer, as a stand-alone software package, partly on the user's computer and partly on a remote computer, or entirely on a remote computer or a server. In the case of executing the program code on a remote computer, the remote computer may be connected to the user's computer via any kind of network, including a Local Area Network (LAN) or a Wide Area Network (WAN), or may be connected to an external computer (for example, by means of an Internet service provider via the Internet).

What is claimed is:

1. A method for selecting a background music for video shooting, comprising:
   acquiring a viewing instruction for a specified music;
   jumping to a details page of a complete music corresponding to the specified music according to the viewing instruction;
   using the complete music as a background music for video shooting after a shooting-the-same instruction is acquired on the details page;
   wherein after using the complete music as the background music for video shooting, the method further comprises:
   clipping a music segment having a same time length as a shot video image from a start point of the complete music, after a video shooting completion instruction is acquired; and
   using the music segment as the background music, synthetizing the music segment with the shot video image to obtain a target video, and displaying a preview playing page of the target video.

2. The method according to claim 1, wherein the acquiring a viewing instruction for a specified music comprises:
   detecting a triggering operation on a music viewing control of a displayed video on a video playing page, and using a background music of the displayed video as the specified music, wherein the triggering operation is used as the viewing instruction for the background music of the displayed video; or
   detecting a triggering operation on a music viewing control of the specified music on a music browsing page, and using the triggering operation on the music viewing control of the specified music as the viewing instruction for the specified music.

3. The method according to claim 2, wherein the video playing page comprises at least two music viewing controls; and the detecting a triggering operation on a music viewing control of a displayed video on a video playing page comprises:
   detecting a triggering operation on one of the at least two music viewing controls of the displayed video on the video playing page.

4. The method according to claim 1, wherein after displaying a preview playing page of the target video, the method further comprises:
   acquiring a start point of the background music selected in the complete music after a music clip instruction is acquired on the preview playing page; and
   re-clipping a music segment having a same time length as the shot video image according to the start point of the selected background music, using the re-clipped music segment as the background music and synthetizing the background music with the shot video image to obtain an edited target video.

5. The method according to claim 1, wherein the details page further comprises: an original musician identification corresponding to the complete music, and a cover of a video shot by using the complete music; and
   the video shot by using the complete music comprises: at least one of a popular video and the latest video.

6. A terminal device, comprising:
   at least one processor; and
   a memory configured to store at least one program;
   wherein when the at least one program is executed by the at least one processor, the at least one processor performs operations of:
   acquiring a viewing instruction for a specified music;
   jumping to a details page of a complete music corresponding to the specified music according to the viewing instruction;
   using the complete music as a background music for video shooting after a shooting-the-same instruction is acquired on the details page;
   wherein after using the complete music as the background music for video shooting, the at least one processor further performs operations of:
   clipping a music segment having a same time length as a shot video image from a start point of the complete music, after a video shooting completion instruction is acquired; and
   using the music segment as the background music, synthetizing the music segment with the shot video image to obtain a target video, and displaying a preview playing page of the target video.

7. A non-transitory computer readable storage medium having a computer program stored thereon, wherein when the computer program is executed by a processor, a method for selecting a background music for video shooting is performed, the method comprising:
   acquiring a viewing instruction for a specified music;
   jumping to a details page of a complete music corresponding to the specified music according to the viewing instruction;
   using the complete music as a background music for video shooting after a shooting-the-same instruction is acquired on the details page;
   wherein after using the complete music as the background music for video shooting, the method further comprises:

clipping a music segment having a same time length as a shot video image from a start point of the complete music, after a video shooting completion instruction is acquired; and using the music segment as the background music, synthetizing the music segment with the shot video image to obtain a target video, and displaying a preview playing page of the target video.

8. The terminal device according to claim 6, wherein the acquiring a viewing instruction for a specified music comprises:

detecting a triggering operation on a music viewing control of a displayed video on a video playing page, and using a background music of the displayed video as the specified music, wherein the triggering operation is used as the viewing instruction for the background music of the displayed video; or detecting a triggering operation on a music viewing control of the specified music on a music browsing page, and using the triggering operation on the music viewing control of the specified music as the viewing instruction for the specified music.

9. The terminal device according to claim 8, wherein the video playing page comprises at least two music viewing controls; and the detecting a triggering operation on a music viewing control of a displayed video on the video playing page comprises:

detecting a triggering operation on one of the at least two music viewing controls of the displayed video on the video playing page.

10. The terminal device according to claim 6, wherein after displaying a preview playing page of the target video, the at least one processor further performs operations of:

acquiring a start point of the background music selected in the complete music after a music clip instruction is acquired on the preview playing page; and re-clipping a music segment having a same time length as the shot video image according to the start point of the selected background music, using the re-clipped music segment as the background music and synthetizing the background music with the shot video image to obtain an edited target video.

11. The terminal device according to claim 6, wherein the details page further comprises: an original musician identification corresponding to the complete music, and a cover of a video shot by using the complete music; and the video shot by using the complete music comprises: at least one of a popular video and the latest video.

12. The non-transitory computer readable storage medium of claim 7, wherein the acquiring a viewing instruction for a specified music comprises:

detecting a triggering operation on a music viewing control of a displayed video on a video playing page, and using a background music of the displayed video as the specified music, wherein the triggering operation is used as the viewing instruction for the background music of the displayed video; or detecting a triggering operation on a music viewing control of the specified music on a music browsing page, and using the triggering operation on the music viewing control of the specified music as the viewing instruction for the specified music.

13. The non-transitory computer readable storage medium of claim 12, wherein the video playing page comprises at least two music viewing controls; and the detecting a triggering operation on a music viewing control of a displayed video on a video playing page comprises:

detecting a triggering operation on one of the at least two music viewing controls of the displayed video on the video playing page.

14. The non-transitory computer readable storage medium of claim 7, wherein after displaying a preview playing page of the target video, the method further comprises:

acquiring a start point of the background music selected in the complete music after a music clip instruction is acquired on the preview playing page; and re-clipping a music segment having a same time length as the shot video image according to the start point of the selected background music, using the re-clipped music segment as the background music and synthetizing the background music with the shot video image to obtain an edited target video.

15. The non-transitory computer readable storage medium of claim 7, wherein the details page further comprises: an original musician identification corresponding to the complete music, and a cover of a video shot by using the complete music; and wherein the video shot by using the complete music comprises at least one of a popular video and the latest video.

\* \* \* \* \*